US011781529B2

(12) United States Patent
van der Velden et al.

(10) Patent No.: US 11,781,529 B2
(45) Date of Patent: Oct. 10, 2023

(54) REMOTE CONDUIT DE-COUPLING DEVICE

(71) Applicant: Enerpac Tool Group Corp., Menomonee Falls, WI (US)

(72) Inventors: J. D. van der Velden, Veenendaal (NL); Jaap Broere, Scherpenzeel (NL); Timo Willemsen, Huissen (NL)

(73) Assignee: Enerpac Tool Group Corp., Menomonee Falls, WI (US)

( * ) Notice: Subject to any disclaimer, the term of this patent is extended or adjusted under 35 U.S.C. 154(b) by 0 days.

(21) Appl. No.: 17/530,041

(22) Filed: Nov. 18, 2021

(65) Prior Publication Data
US 2022/0220945 A1 Jul. 14, 2022

Related U.S. Application Data

(63) Continuation of application No. 16/159,390, filed on Oct. 12, 2018, now abandoned.
(Continued)

(51) Int. Cl.
*F03D 80/80* (2016.01)
*F15B 15/20* (2006.01)
(Continued)

(52) U.S. Cl.
CPC .............. *F03D 80/85* (2016.05); *B66F 3/247* (2013.01); *B66F 11/00* (2013.01); *F03D 7/042* (2013.01);
(Continued)

(58) Field of Classification Search
CPC ......... B23P 19/00; B23P 19/02; B23P 19/025; B23P 19/027; B23P 19/04; B23P 19/041;
(Continued)

(56) References Cited

U.S. PATENT DOCUMENTS 2,887,124 A * 5/1959 Mehl ..................... F16L 37/002
285/306
3,222,088 A 12/1965 Haeber
(Continued)

FOREIGN PATENT DOCUMENTS

EP         0036761 A2    9/1981
EP      E P-0036761 A2 * 9/1981  .............. F15B 13/01
WO        0026572 A1    5/2000

OTHER PUBLICATIONS

Extended Search Report issued from the European Patent Office for related Application No. 18200376.4 dated Apr. 5, 2019 (9 Pages).
(Continued)

*Primary Examiner* — Tyrone V Hall, Jr.
(74) *Attorney, Agent, or Firm* — ANDRUS INTELLECTUAL PROPERTY LAW, LLP

(57) ABSTRACT

A jack assembly and a system for supporting a partially submerged structure. The jack assembly may include a fluid jack including a cylinder and a ram, the cylinder having at least one fluid chamber configured to receive a pressurized fluid to move the ram; and a valve housing removably coupled to the fluid jack for providing fluid communication between the fluid jack and at least one fluid conduit, the valve housing including a link movable from a first position toward a second position, the valve housing being secured to the jack while the link is in the first position, the valve assembly being disconnectable from the jack while the link is in the second position.

14 Claims, 14 Drawing Sheets

Related U.S. Application Data

(60) Provisional application No. 62/592,139, filed on Nov. 29, 2017, provisional application No. 62/572,198, filed on Oct. 13, 2017.

(51) Int. Cl.
| | |
|---|---|
| *F03D 80/50* | (2016.01) |
| *B66F 3/24* | (2006.01) |
| *B66F 11/00* | (2006.01) |
| *F03D 7/04* | (2006.01) |
| *F03D 13/20* | (2016.01) |
| *F03D 9/30* | (2016.01) |
| *F03D 13/25* | (2016.01) |
| *F16D 1/09* | (2006.01) |

(52) U.S. Cl.
CPC ............ *F03D 80/50* (2016.05); *F15B 15/202* (2013.01); *F03D 9/30* (2016.05); *F03D 13/22* (2016.05); *F03D 13/25* (2016.05); *F05B 2230/61* (2013.01); *F16D 2001/0906* (2013.01)

(58) Field of Classification Search
CPC ..... B23P 19/046; B23Q 1/0072; B23Q 3/082; B23Q 3/102; B23Q 3/106; B25B 27/0035; B25B 27/026; B25B 27/16; B25D 9/12; F16L 37/32; B66F 3/24; B66F 3/246; B66F 3/25; B66F 3/247; Y10S 285/92; Y10S 279/12; Y10S 279/1241; Y10S 279/1291; E02B 17/08; E02B 2017/0091; Y10T 279/12; Y10T 279/1241; Y10T 279/1291

See application file for complete search history.

(56) References Cited

U.S. PATENT DOCUMENTS

| | | |
|---|---|---|
| 3,228,658 A | 1/1966 | London |
| 3,842,612 A | 10/1974 | Arnold |
| 4,431,215 A | 2/1984 | Moyer |
| 4,624,290 A | 11/1986 | Compton et al. |
| 4,979,366 A | 12/1990 | Compton et al. |
| 5,771,927 A | 6/1998 | Johansen et al. |
| 6,343,654 B1 | 2/2002 | Brammer |
| 6,895,648 B1 | 5/2005 | Willett |
| 6,966,382 B2 | 11/2005 | Buckle et al. |
| 7,624,792 B2 | 12/2009 | Wright et al. |
| 8,322,442 B2 | 12/2012 | Voss |
| 8,474,537 B2 | 7/2013 | Voss et al. |
| 8,485,267 B2 | 7/2013 | Nguyen et al. |
| 8,826,988 B2 | 9/2014 | Gray et al. |
| 9,062,513 B2 | 6/2015 | Pallini, Jr. et al. |
| 2014/0301788 A1* | 10/2014 | Khachaturian ..... E02B 17/0809 405/197 |

OTHER PUBLICATIONS

Office action issued from the European Patent Office for related U.S. Appl. No. 18/200,376 4 dated Mar. 5, 2021 (5 Pages).

\* cited by examiner

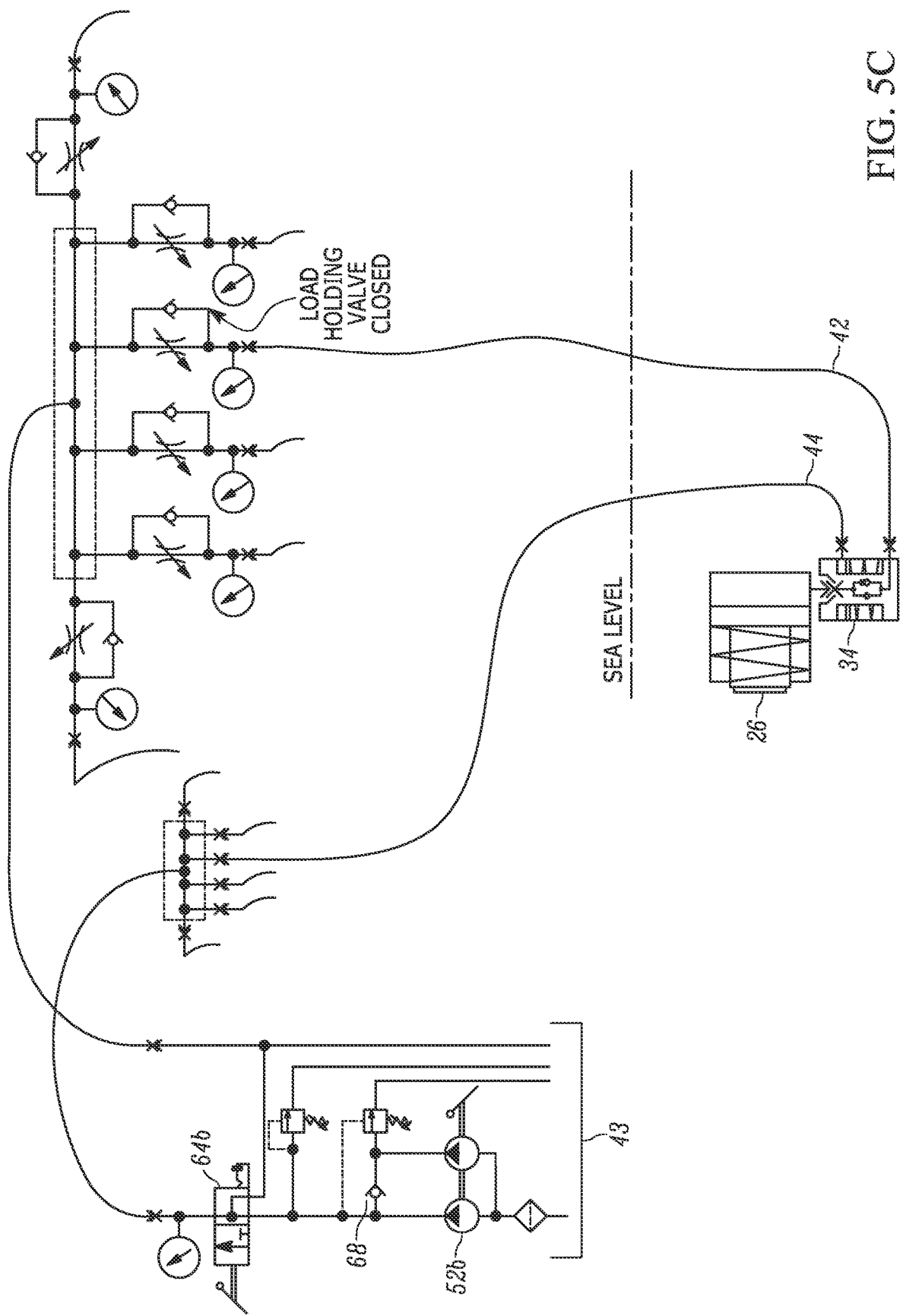

REMOTE CONDUIT DE-COUPLING DEVICE

REFERENCE TO RELATED APPLICATIONS

This application is a continuation of U.S. patent application Ser. No. 16/159,390, filed Oct. 12, 2018, which claims the benefit of prior-filed U.S. Provisional Patent Application No. 62/572,198, filed Oct. 13, 2017, and prior-filed U.S. Provisional Patent Application No. 62/592,139, filed Nov. 29, 2017, the entire contents of all of which are hereby incorporated by reference.

FIELD

The present disclosure relates to a device for remotely de-coupling or disconnecting conduit, such as fluid conduit, from another device, such as a fluid jack.

SUMMARY

Fluid jacks, such as hydraulic jacks, receive a pressurized fluid to provide a hydraulic or mechanical force to lift and/or support a load. The load can be an off-shore structure, such as an off-shore wind turbine for generating electricity. In such applications, at least some of the fluid jacks can be submerged to support the structure underwater.

In one independent aspect, a jack assembly includes a fluid jack and a valve housing. The fluid jack includes a cylinder and a ram. The cylinder has at least one fluid chamber configured to receive a pressurized fluid to move the ram. The valve housing is removably coupled to the fluid jack for providing fluid communication between the fluid jack and at least one fluid conduit. The valve housing includes a link movable between a first position and a second position. The valve housing is secured to the jack while the link is in the first position, and the valve assembly is disconnectable from the jack while the link is in the second position.

In another independent aspect, a conduit de-coupling device includes a supply port, a coupler for selectively engaging a connected device, a link positioned adjacent the coupler, and a disconnect port. The link is moveable between a first position in which the coupler is secured in engagement with the connected device, and a second position in which the coupler is permitted to disengage the connected device. The link is biased toward the first position. The disconnect port is in fluid communication with a fluid source to receive pressurized fluid to move the link from the first position to the second position.

In yet another independent aspect, a system for supporting a partially submerged structure includes a fluid jack, a first supply line for providing pressurized fluid to the fluid jack, and a device for removably coupling the first supply line to the fluid jack. The fluid jack includes a cylinder and a ram. The cylinder has at least one fluid chamber configured to receive a pressurized fluid to move the ram, and the ram is configured to engage a submerged portion of the structure. The device includes a coupler and a link. The coupler is configured to selectively engage a fitting of the fluid jack to facilitate fluid communication between the first supply line and the fluid jack. The link is movable between a first position and a second position. The link permits the coupler to be secured to the fluid jack while the link is in the first position, and the link permits disconnection of the coupler from the fluid jack while the link is in the second position. The system further includes a second supply line for providing pressurized fluid to the device to actuate the link.

Other independent aspects of the disclosure will become apparent by consideration of the detailed description, claims, and accompanying drawings.

BRIEF DESCRIPTION OF THE DRAWINGS

FIG. 5C is a schematic of the fluid jack system of FIG. 5B activating a de-coupling device.

DETAILED DESCRIPTION

Before any independent embodiments are explained in detail, it is to be understood that the disclosure is not limited in its application to the details of construction and the arrangement of components set forth in the following description or illustrated in the following drawings. The disclosure is capable of other independent embodiments and of being practiced or of being carried out in various ways. Also, it is to be understood that the phraseology and terminology used herein is for the purpose of description and should not be regarded as limiting. The use of "including", "comprising", or "having" and variations thereof herein is meant to encompass the items listed thereafter and equivalents thereof as well as additional items. Unless specified or limited otherwise, the terms "mounted", "connected", "supported", and "coupled" and variations thereof are used broadly and encompass both direct and indirect mountings, connections, supports, and couplings. Further, "connected" and "coupled" are not restricted to physical or mechanical connections or couplings.

The disclosure generally relates to a de-coupling device for remotely disconnecting conduit, such as fluid hoses. The de-coupling device is described below with respect to a fluid jack system for supporting an off-shore support structure (e.g., for a wind turbine). However, it is understood that the de-coupling device can be readily adapted for other applications and is not limited to the embodiments described below.

Figure 1:
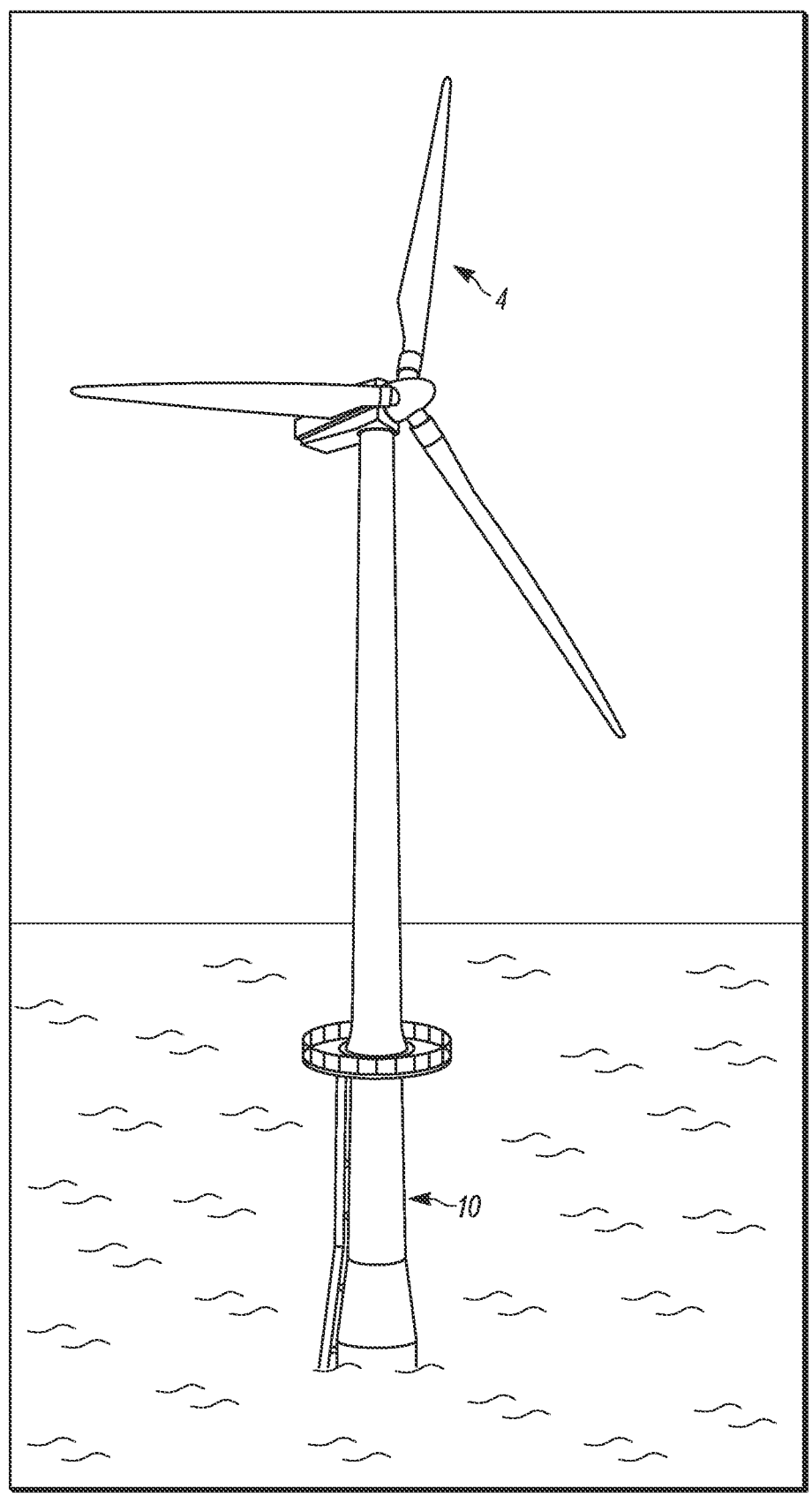
FIG. 1 is a perspective view of a wind turbine supported on an off-shore platform.
Figure 2:
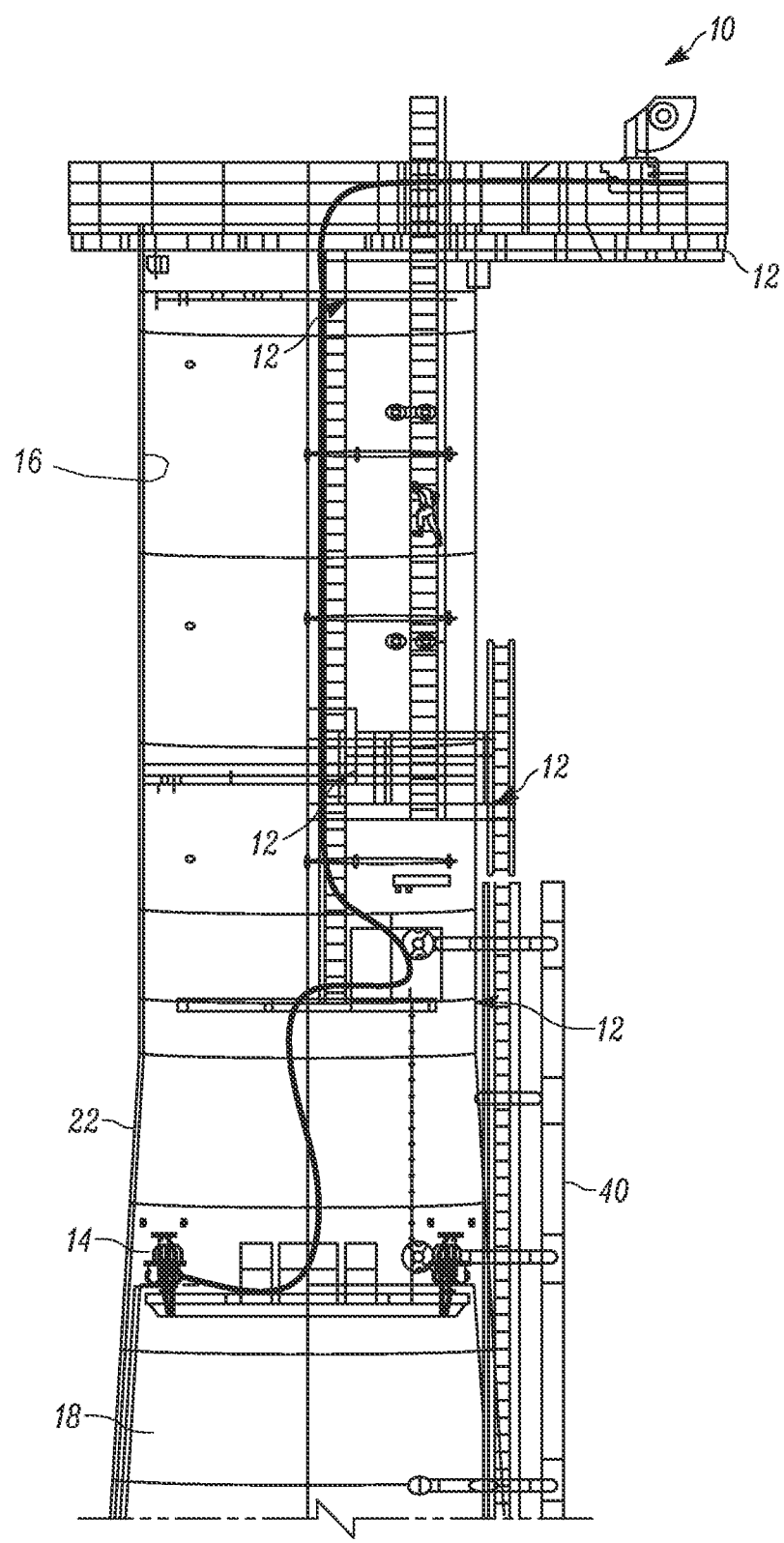
FIG. 2 is a cross-section side view of a platform.

FIG. 1 illustrates a support structure 10, e.g. for supporting an off-shore wind turbine 4. In some embodiments, the support structure 10 is at least partially submerged in a body of water. As shown in FIG. 2, in the illustrated embodiment, the support structure 10 includes a foundation 18 and a transition structure 22. The foundation 18 is coupled to and supports the transition structure 22, which in turn is coupled to the wind turbine 4. The foundation 18 may be supported on a seabed (not shown), either directly or by an intermediate support structure (not shown). In the illustrated embodiment, the foundation is a monopile 18.

Figure 3:
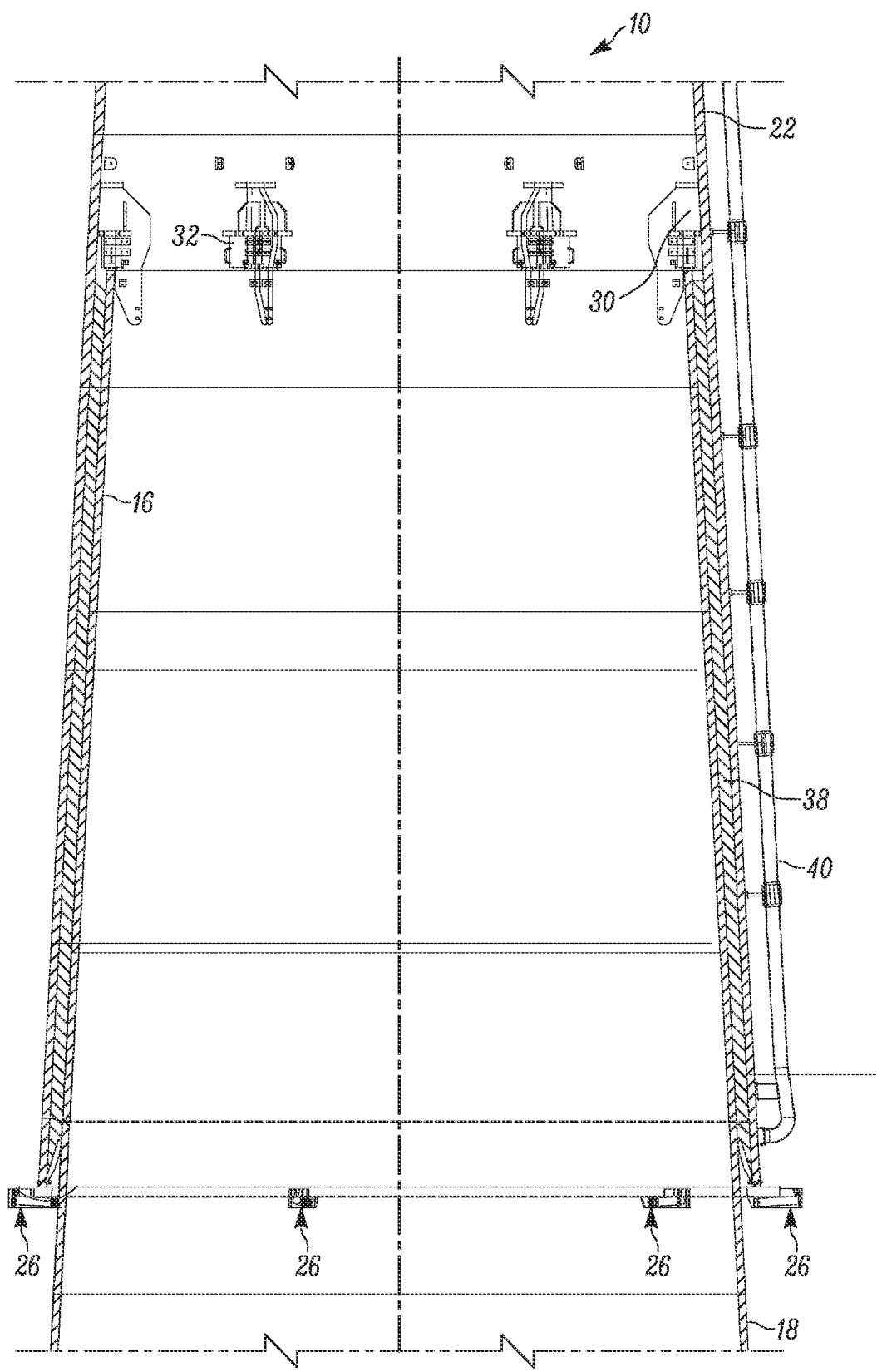
FIG. 3 is a side cross-section view of a portion of the platform of FIG. 2.

As best shown in FIGS. 2 and 3, in the illustrated embodiment, the transition structure 22 is mounted on an upper end of the monopile 18. The monopile 18 can have a tapered or frustoconical upper portion that mates with a similarly tapered or frustoconical portion of the transition structure 22. In the illustrated embodiment, the transition structure 22 may include platforms 12 at predetermined levels, including a service platform 12 adjacent an upper end. Also, an opening or passage 16 can extends through the center of the monopile 18 and the transition structure 22.

Figure 4:
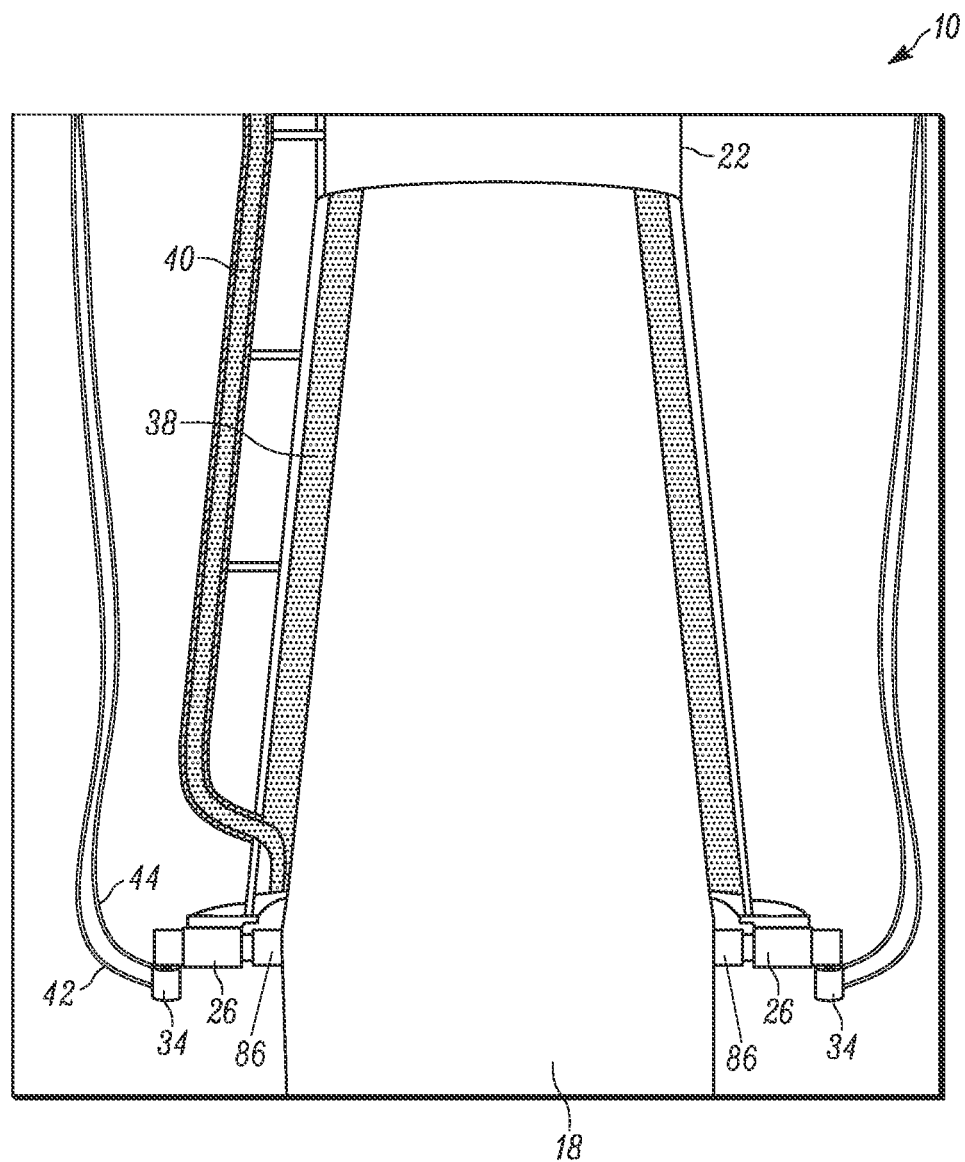
FIG. 4 is another side cross-section view of the portion of the platform of FIG. 3

Referring now to FIGS. 3 and 4, the transition structure 22 is supported on the monopile 18 by a jack system. In particular, in the illustrated embodiment, the jack system includes fluid jacks, including fixation cylinders 26 and leveling cylinders 32 (FIG. 3). The fixation cylinders 26 are positioned adjacent a lower end of the transition structure 22. Each fixation cylinder 26 includes a ram 86 (FIG. 8) extending radially inwardly to engage an outer surface of the monopile 18. Stated another way, the fixation cylinders 26 secure or clamp the transition structure 22 relative to the monopile 18. The leveling cylinders 32 are coupled to the transition piece 22 and engage the upper edge of the monopile 18. In some embodiments, each leveling cylinder 32 includes a ram (not shown) engaging the upper edge of the monopile 18. The individual fixation cylinders 26 can be actuated independently or synchronously in order to secure the transition structure 22 in a desired position. Similarly, the individual leveling cylinders 32 can be actuated independently or synchronously in order to secure the transition structure 22 in a desired position. Each of the fluid jacks 26, 32 may be in fluid communication with a fluid source (e.g., a pump) through a de-coupling device 34 (FIG. 4).

As shown in FIGS. 3 and 4, in some embodiments a tube or hose 40 extends along at least a portion of the transition structure 22 and is in fluid communication with a space between the monopile 18 and transition structure 22. Once the transition structure 22 is in a desired position, the hose 40 delivers a securing medium 38 (e.g., grout) to the space between the monopile 18 and the transition structure 22. The securing medium is then permitted to cure or set, thereby securing the transition structure 22 to the monopile 18. In some embodiments, the fixation cylinders 26 and leveling cylinders 32 support the transition structure 22 in a desired positioned while the securing medium 38 is introduced and cured. Once the connection is set, the de-coupling device 34 facilitates disconnection of the fixation cylinders from the fluid source in an environmentally sustainable manner.

Figure 5A:
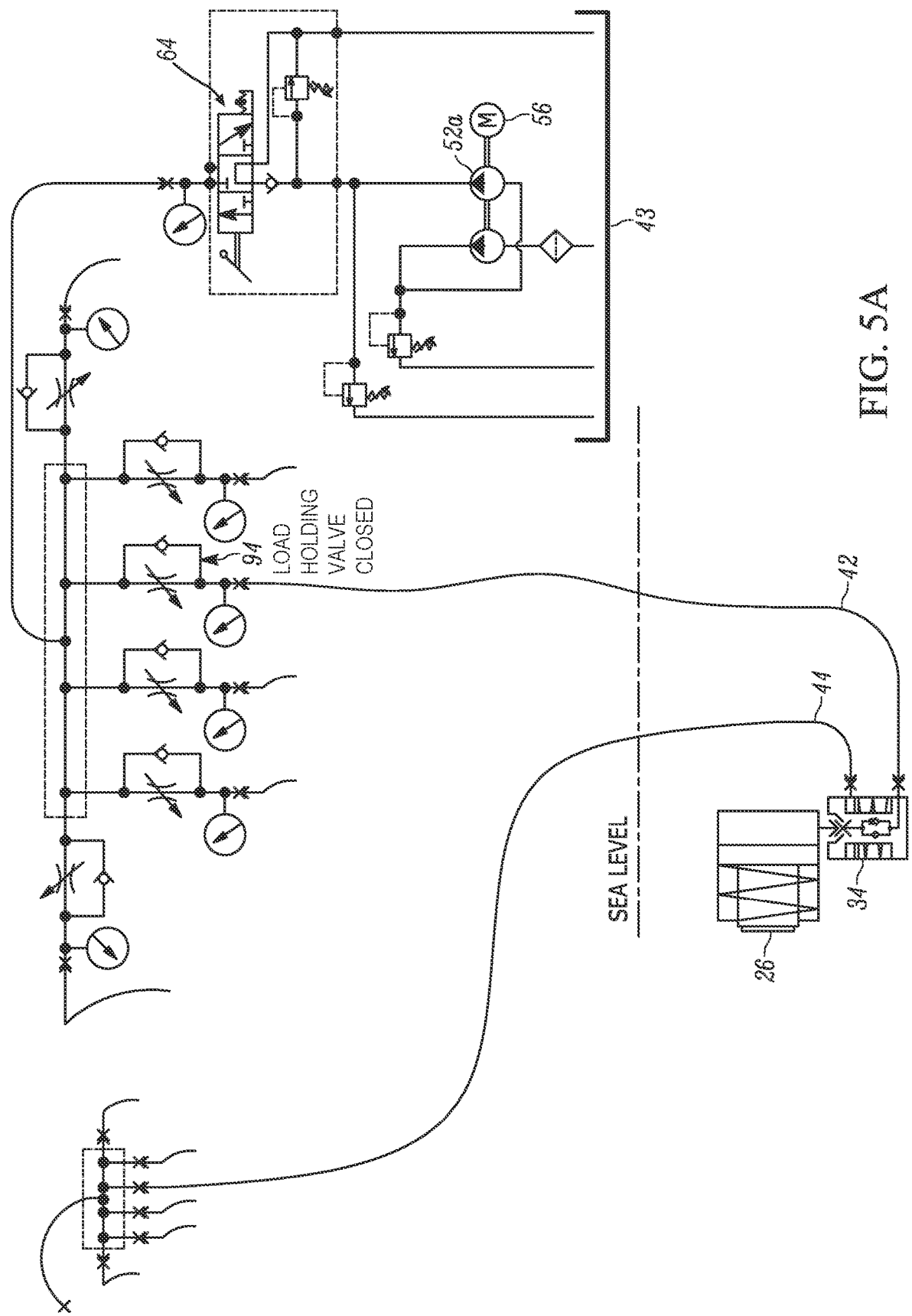
FIG. 5A is a schematic of a fluid jack system with a fixation jack in a retracted state.
Figure 5B:
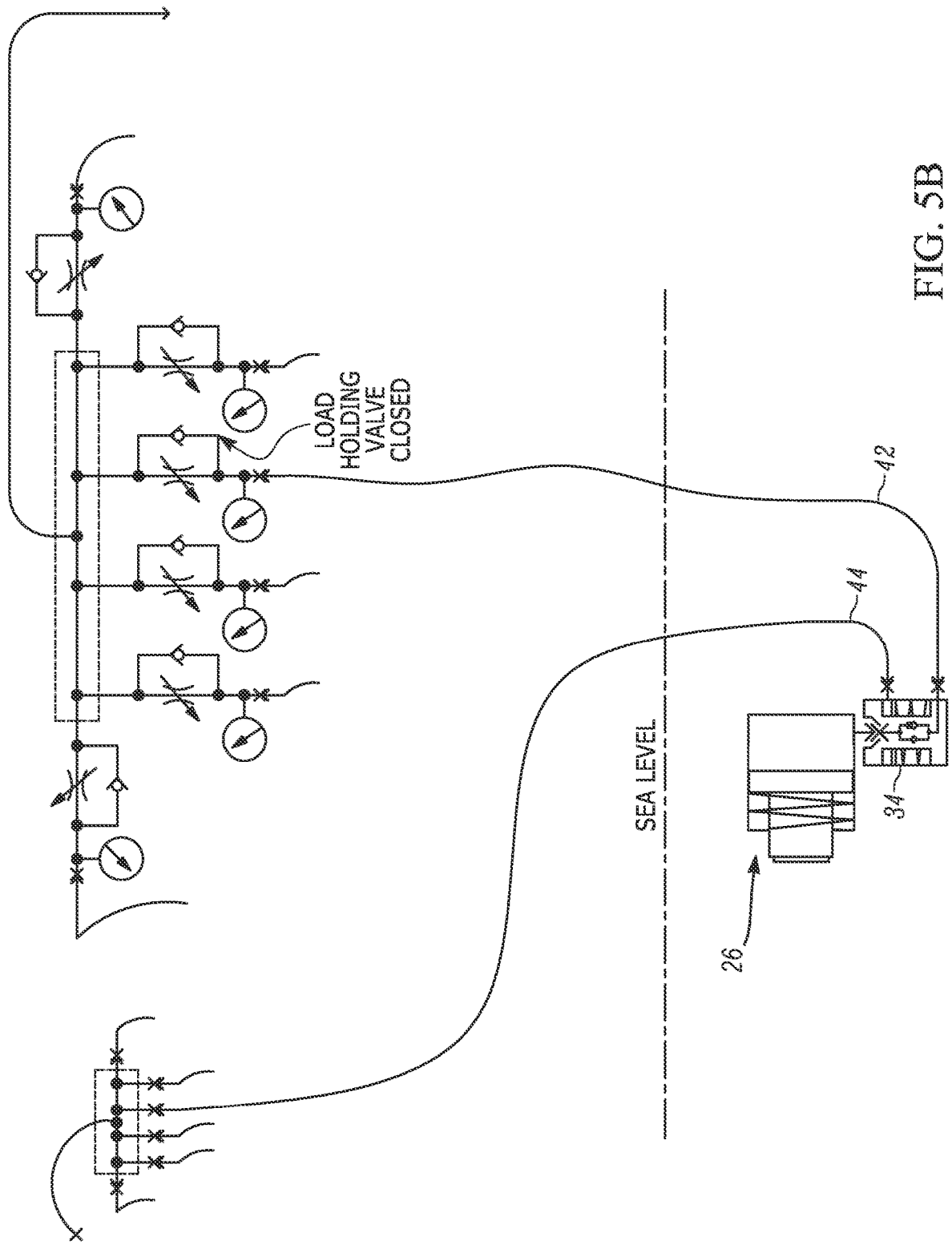
FIG. 5B is a schematic of the fluid jack system of FIG. 5A, with the fixation jack in an extended state.

FIGS. 5A-5C illustrate an exemplary hydraulic circuit for the fixation cylinders 26. For simplicity, one fixation cylinder 26 is shown in FIGS. 5A-5C. As shown in FIG. 5A, the fixation cylinder 26 is initially in a retracted state (i.e., a plunger or ram is in a retracted position). The fixation cylinder 26 is connected to the de-coupling device 34 to receive pressurized fluid 48 from a first conduit or supply line 42 at a first pressure or supply pressure. The supply line 42 is in fluid communication with one or more supply pumps 52a. In the illustrated embodiment, the pumps 52a draw fluid, e.g. hydraulic oil, from a supply tank 43 and are driven by a motor 56. Flow from the pump(s) 52a to the de-coupling device 34 and cylinder 26 is controlled by a control valve 64a.

The flow from the pump(s) 52a drives the ram of each fixation cylinder 26 to extend and engage the monopile 18 (FIG. 4), and the coordinated actuation of the fixation cylinders 26 maintains or secures the transition structure 22 in a desired position relative to the monopile 18. In addition, a load holding valve 94 remains closed to prevent reverse flow from the cylinder 26. As shown in FIG. 5A, the system may include a manifold having multiple load holding valves 94, with each valve 94 being associated with a respective fixation cylinder 26.

As shown in FIG. 5B, in the illustrated embodiment, the cylinder 26 is disconnected from the supply pump(s) 52a, and the load holding valve 94 remains closed to secure the rod of the fixation cylinder 26 in the extended position. The cylinder 26 remains in this state while the securing medium 38 (FIG. 4) is introduced between the monopile 18 and transition structure 22, until the grout has sufficiently cured to provide a stable connection.

As shown in FIG. 5C, after the medium is cured and the connection between the monopile 18 and transition structure 22 is secure, the system is operated to provide fluid to the de-coupling device 34 by a second supply conduit or "disconnect" line 44. In the illustrated embodiment, the fluid in the disconnect line 44 is at a lower pressure than fluid in the supply line 42. In addition, the load holding valve 94 is opened to place the supply line 42 in communication with a drain tank or reservoir 43. The fixation cylinder 26 is therefore depressurized and the ram 86 (FIG. 4) is retracted. The disconnect line 44 provides fluid communication between the pumps 52b and the de-coupling device 34. In the illustrated embodiment, the pumps 52b draw fluid (e.g., hydraulic oil) from a tank, and flow from the pumps 52b is controlled by a control valve 64b. In some embodiments, the pump 52b may be a hand pump. Also, in some embodiments, the disconnect line 44 may be in fluid communication with one or more pumps 52b during retraction of the cylinder 26. Activation of the de-coupling device 34 disconnects the fixation cylinder 26 from the fluid lines and the fluid source, as discussed in further detail below.

Figure 6:
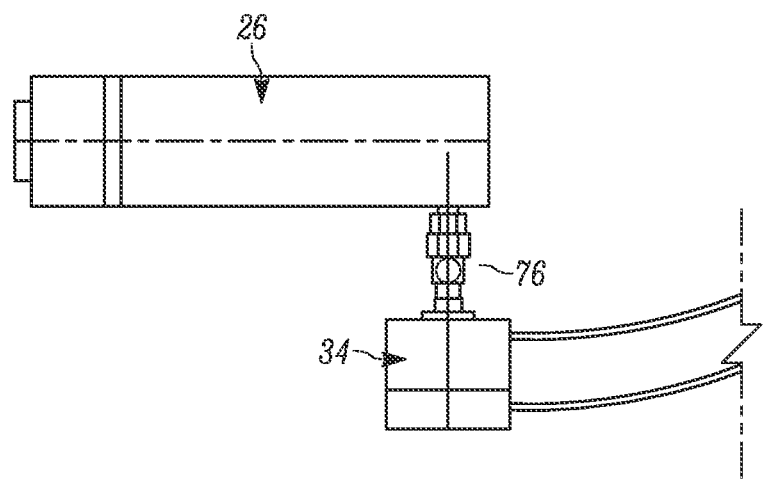
FIG. 6 is a schematic of a fluid cylinder and a de-coupling device.

Referring to FIG. 6, the fixation cylinder 26 is directly coupled to the de-coupling device 34. For example, the fixation cylinder 26 includes a supply port 76 that is mechanically connected to the de-coupling device 34. In the illustrated embodiment, the fixation cylinder 26 is a single-acting cylinder and the ram 86 (FIG. 4) is movable when pressurized fluid 48 enters the cylinder. The ram 86 may be biased by a spring (not shown) to retract when the pressure of the fluid 48 in the cylinder is below a predetermined level. As the ram retracts, pressurized fluid 48 moves out of the fixation cylinder 26 and into the supply line 42.

As shown in FIGS. 7A-7D, the de-coupling device 34 includes a first port 72 adapted to engage the supply port 76 of the cylinder 26. In the illustrated embodiment, the first port 72 includes a female sleeve member 72 and the supply port 76 includes a male input member 76. The de-coupling device 34 further includes a sliding member or link or plunger 80 positioned adjacent the first port 72. The sliding member 80 is moveable between a first position (FIGS. 7A, 7B, 8, and 9) in which the first port 72 is permitted to engage the supply port 76, and a second position (FIGS. 7C, 7D, and 10) in which the first port 72 is disengaged from the supply port 76 of the cylinder 26. The sliding member 80 is biased towards the first position via a biasing member or spring 84. In the illustrated embodiment, the sliding member 80 includes a flange or protrusion 82 engaging the first port 72, and a piston portion 90 in fluid communication with the disconnect line 44. When pressurized fluid 48 is supplied via the disconnect line 44 to move the piston portion 90 against the spring 84, the protrusion 82 of the sliding member 80 moves to the second position, engaging and moving the connecting portion of the first port 72 (e.g., the female sleeve member 72) and thereby disengaging the de-coupling device 34 from the cylinder 26.

Figure 7A:
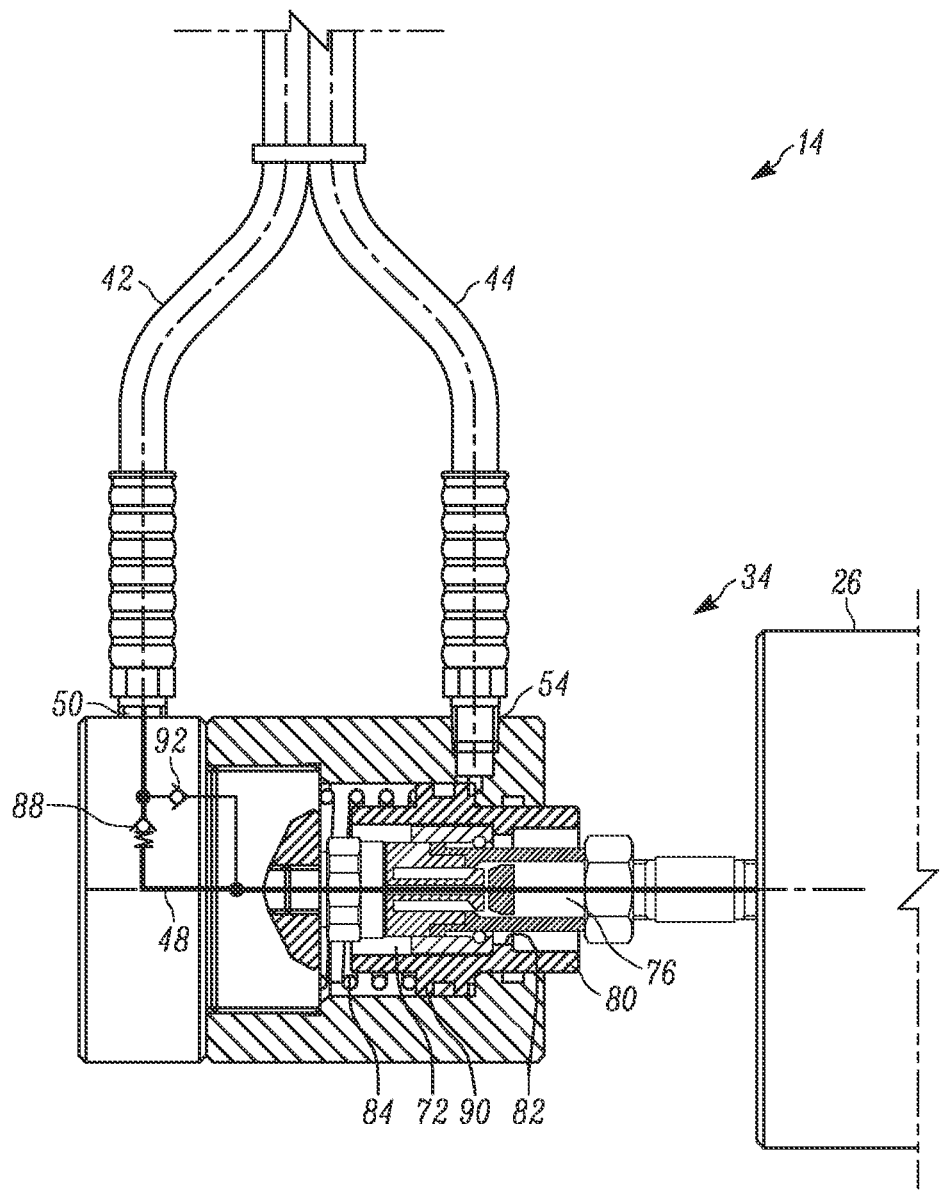
FIG. 7A-7D are cross-sectional views of the de-coupling device in communication with a supply line and a disconnect line.
Figure 7B:
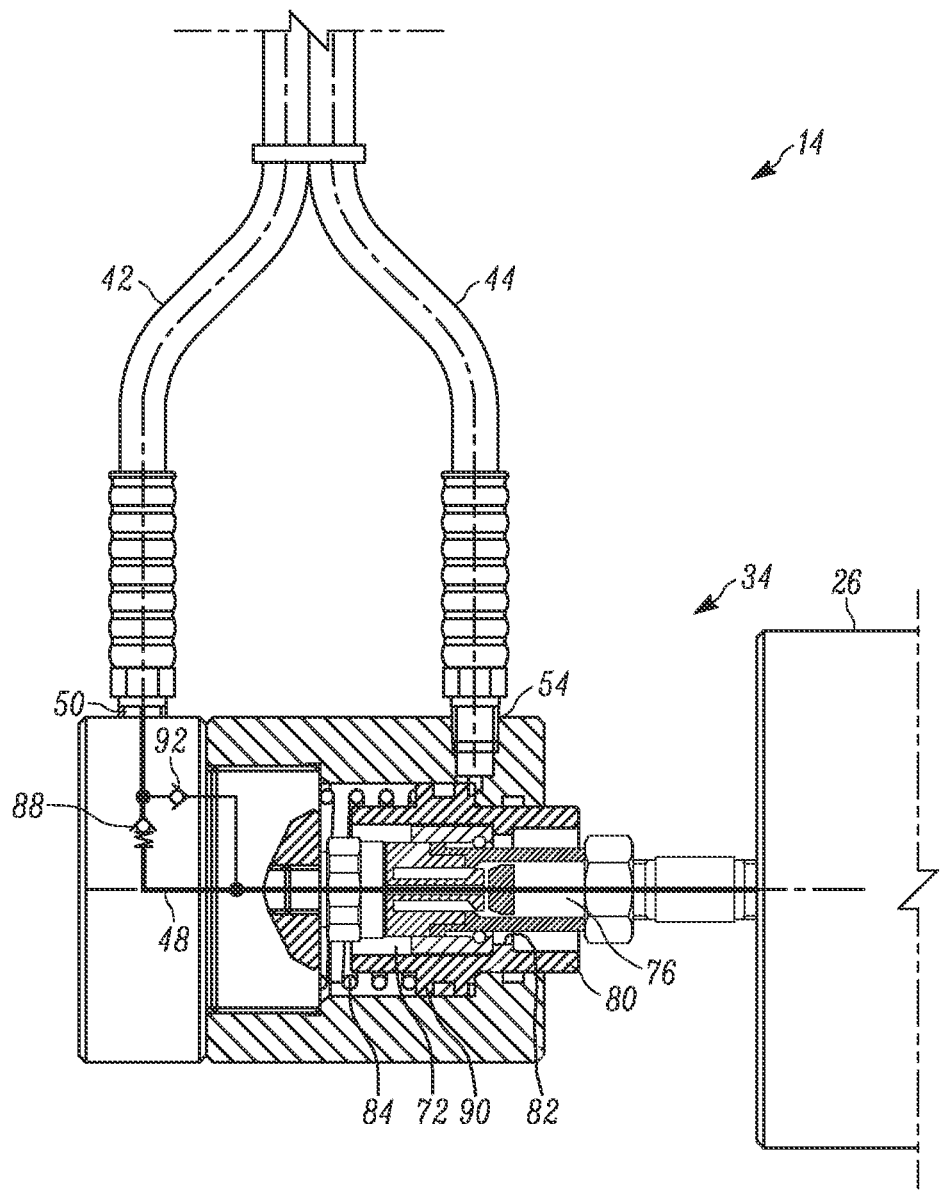
Figure 7C:
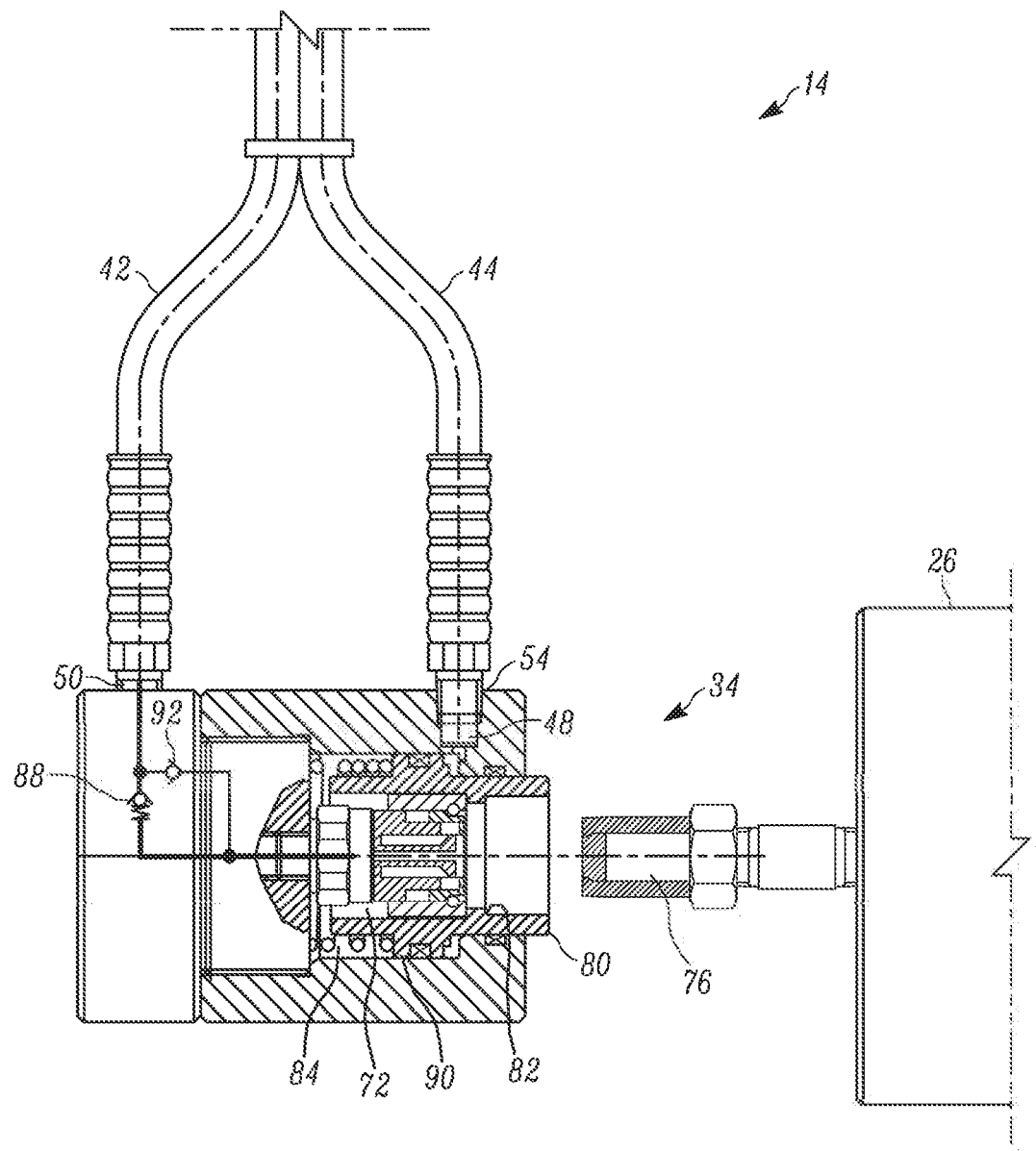
Figure 7D:
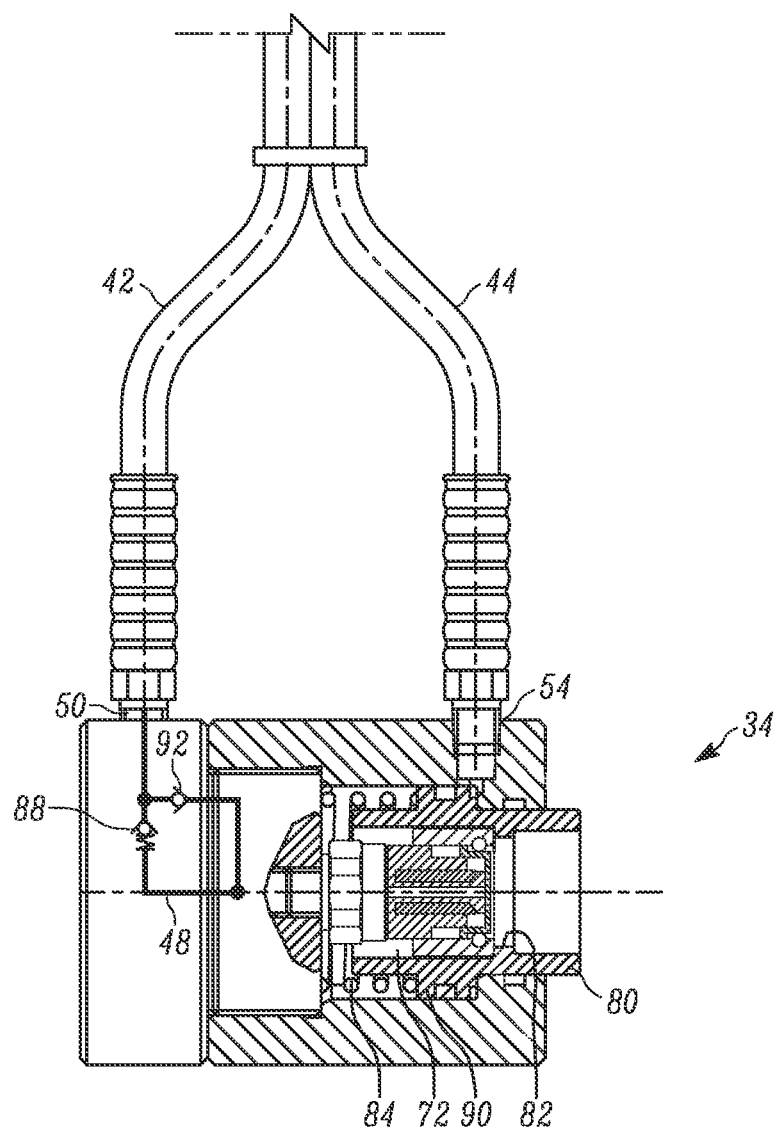
Figure 8:
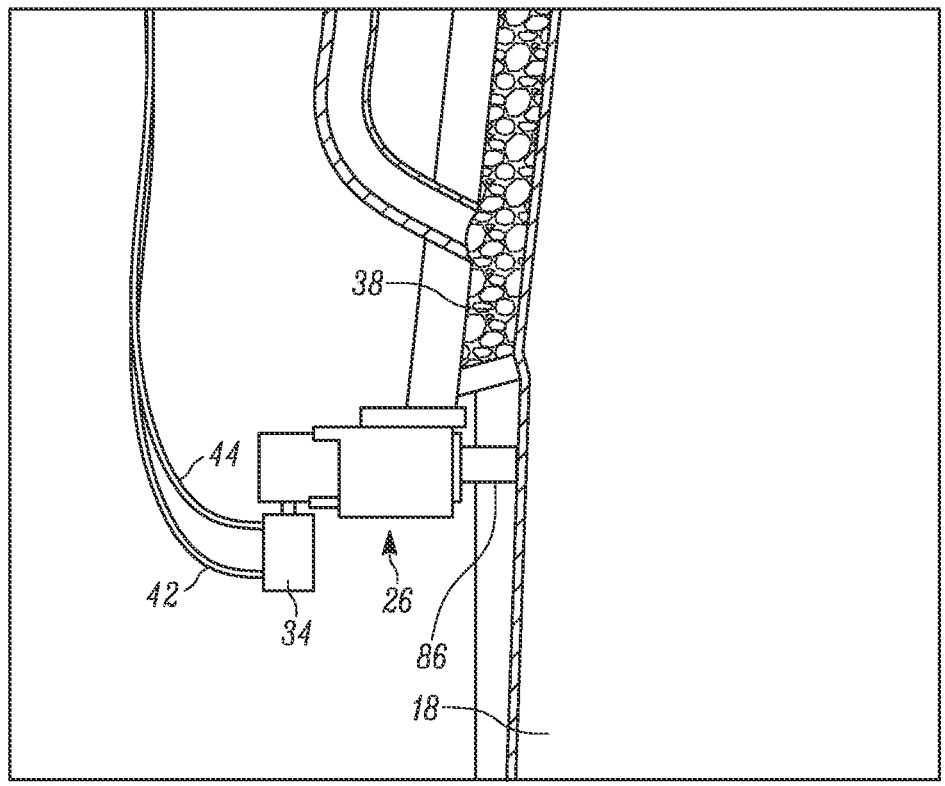
FIG. 8 is a perspective view of a fixation cylinder engaging a portion of a monopile.
Figure 9:
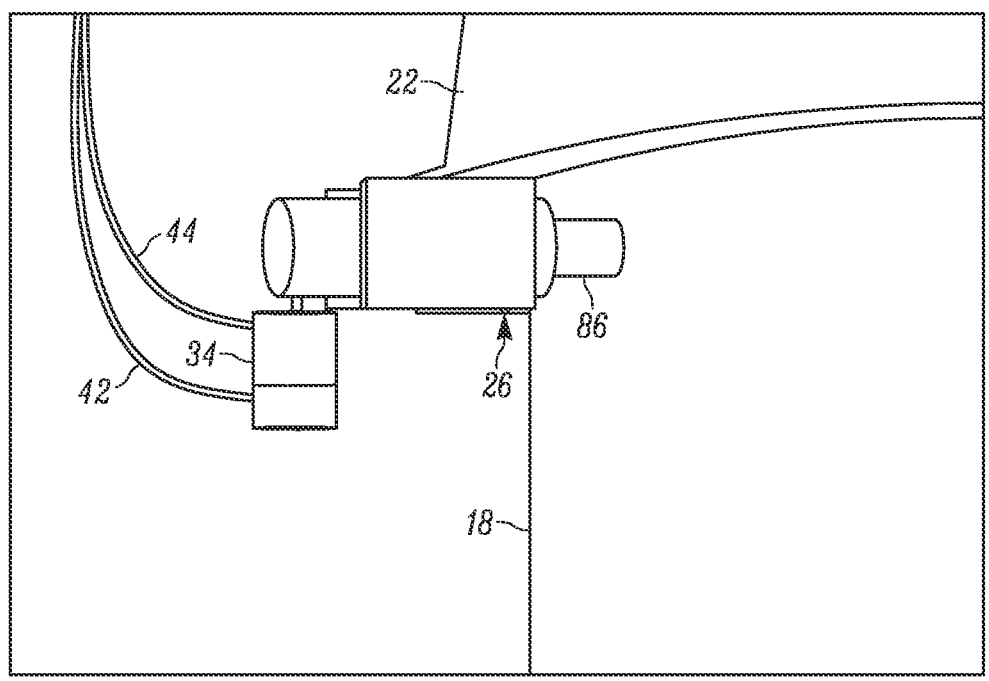
FIG. 9 is another perspective view of the fixation cylinder of FIG. 8 with a de-coupling device in a connected position.
Figure 10:
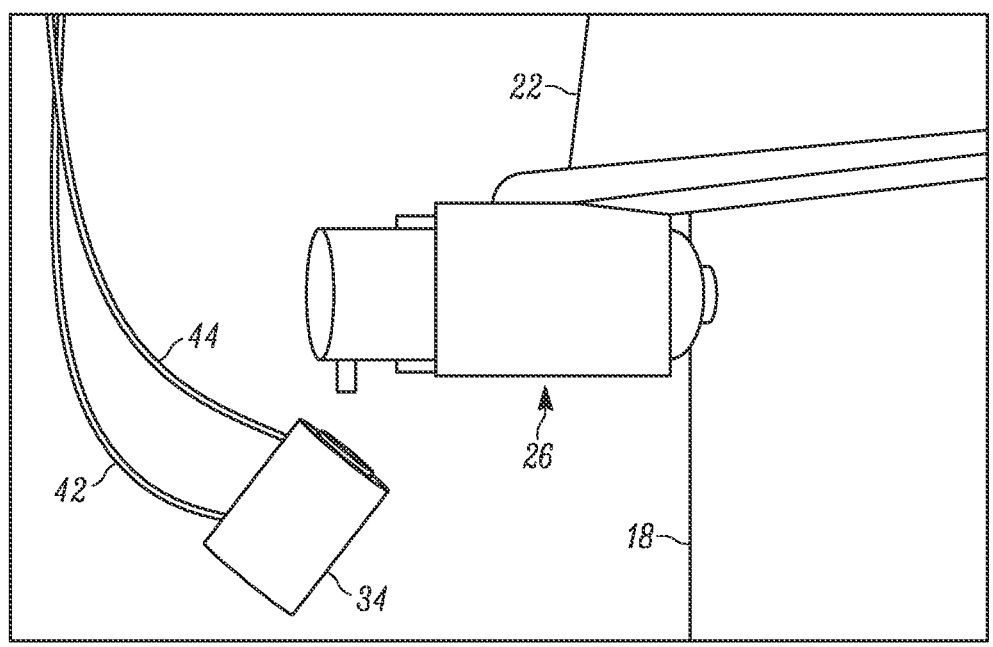
FIG. 10 is a perspective view of the fixation cylinder and de-coupling device of FIG. 9 with the de-coupling device in a disconnected position.

The de-coupling device 34 provides a releasable connection between the supply line 42 and the cylinder 26. As shown in FIG. 7A, the cylinder 26 is actuated by supplying pressurized fluid 48 through a first inlet 50 of the de-coupling device 34 from the supply line 42. While the sliding member 80 is in the first position (FIG. 7A), the pressurized fluid 48 is delivered to the fixation cylinder 26, pressurizing the cylinder 26 and extending the ram 86 to engage the monopile 18 (FIGS. 8 and 9). When it is no longer necessary to provide fluid to the cylinder 26, the pump 52a is stopped and disconnected, with the load holding valves 94 closed in order to lock the pressure in the fixation cylinder 26 (FIG. 5B). The system is connected to secondary pump (not shown) and the load holding valves 94 are opened to release pressure in the lines 42, causing the plunger of each fixation cylinder 26 to retract. Pressurized fluid 48 is supplied through the disconnect line 44, moving the sliding member 80 to the second position (FIG. 7C). In this position, the de-coupling device 34 can be removed from the fixation cylinder 26 (FIGS. 7D and 10).

During installation, as shown in FIG. 4, the transition structure 22 is positioned on the monopile 18. Each of the fixation cylinders 26 is activated via fluid 48 delivered by the supply line 42. Each of the fixation cylinders 26 may be pressurized to a predetermined level. As illustrated in FIG. 5B, the system is disconnected from the secondary pump (not shown). A securing medium 38, e.g. grout, is then introduced into a space between the monopile 18 and the transition structure 22 via the hose 40. Once the securing medium 38 has set or cured, yet another pump (not shown) is connected to the system (FIG. 5C) and one or more load holding valves 94 may be opened, causing the pressurized fluid 48 to be drained through the line 42 and into the tank 43. The control valve 64b (FIG. 5C) is then activated to deliver fluid to the second inlet 54 (FIG. 7C) of the de-coupling device 34 through the disconnect line 44, disengaging the de-coupling device 34 from the fixation cylinder 26.

Also, in the illustrated embodiment shown in FIG. 7A, the de-coupling device 34 includes a sequence valve or main valve 88 and a check valve 92. The main valve 88 is moveable to an open position to permit fluid flow when the pressure of fluid from the supply line 42 exceeds a threshold pressure. This configuration avoids a situation in which the ram 86 of the fixation cylinder 26 might extend due to a head pressure of the fluid column in the conduit 42. During retraction, the fluid can flow freely back through the check valve 92. In other embodiments, the pressure regulator may include other types and/or configurations of valves. The check valve 92 releases the pressurized fluid from the fixation cylinder 26 when the line 42 is depressurized.

The de-coupling device 34 permits an operator to remotely disconnect the conduit or lines, particularly from cylinders 26 that may be submerged. The de-coupling device 34 avoids the need to manually disconnect or cut the supply lines, thereby simplifying the installation process and also reducing pollution by avoiding spilling residual fluid in the lines into the sea. Once the de-coupling device 34 disengages the fixation cylinder 26, an internal valve (not shown) will prevent leakage of fluid in the lines or de-coupling device. In addition, the de-coupling device 34 is re-usable in that is can be easily connected to another cylinder and used in a similar manner. Although the de-coupling device 34 has been described above with respect to the fixation cylinders 26, it is understood that a similar de-coupling device could be connected to a cylinder in another application, and to cylinders used for other functions, such as supporting a load.

The independent embodiments described above and illustrated in the figures are presented by way of example only and are not intended as a limitation upon the concepts and principles of the present disclosure. As such, it will be appreciated that variations and modifications to the elements and their configuration and/or arrangement exist within the spirit and scope of one or more independent aspects as described.

What is claimed is:

1. A jack assembly comprising:
a fluid jack comprising a cylinder and a ram, the cylinder having at least one fluid chamber configured to receive pressurized fluid to move the ram;
a decoupling device removably coupled to the fluid jack for providing fluid communication between the fluid jack and a supply of pressurized fluid, the decoupling device comprising a link which is movable into and between a first position and a second position, the decoupling device being secured to the fluid jack when the link is in the first position, and the decoupling device being disconnectable from the fluid jack when the link is in the second position;
wherein the link is biased into the first position; and
a supply line and a disconnect line which are configured to provide the pressurized fluid to the cylinder via the decoupling device,
wherein the decoupling device has a supply port coupled to the supply line and a disconnect port coupled to the disconnect line, and
wherein the link comprises an annular flange or protrusion which engages the supply port in the first position, and further wherein the annular flange or protrusion is caused to disengage the decoupling device from the fluid jack when the pressurized fluid is provided via the disconnect line.

2. The jack assembly of claim 1, wherein one of the supply port and the disconnect port is engageable with a male fitting and another one of the supply port and the disconnect port is engageable with a female fitting to prevent fluid conduits from being improperly connected to the jack assembly.

3. The jack assembly of claim 1, further comprising a male coupler positioned on one of the cylinder and the decoupling device, and a female coupler positioned on another one of the cylinder and the decoupling device, wherein the male coupler and the female coupler engage one another when the link is in the first position, and the male coupler and the female coupler are disengaged when the link is in the second position.

4. The jack assembly of claim 1, wherein the decoupling device further comprises a first valve and a second valve, the first valve permitting fluid flow to the cylinder when a pressure of the pressurized fluid is above a predetermined threshold, the second valve selectively opening a passage to permit at least some of the pressurized fluid to be drained.

5. The jack assembly of claim 1, wherein the decoupling device further comprises a check valve, the check valve being movable to an open position to permit fluid flow when a pressure of the pressurized fluid passing through the supply port exceeds a threshold pressure.

6. The jack assembly of claim 1, wherein the decoupling device further comprises a feedback valve, the feedback valve diverting a portion of the pressurized fluid when a pressure of the pressurized fluid exceeds a predetermined pressure.

7. A system for supporting a partially submerged structure, the system comprising:
- a monopile;
- a transition structure mounted on an upper end of the monopile;
- a plurality of fluid jacks which each comprise a cylinder and a ram, the cylinder having at least one fluid chamber configured to receive pressurized fluid to move the ram, the ram being configured to engage a submerged portion of the partially submerged structure;
- each fluid jack in the plurality of fluid jacks having a first supply line for providing the pressurized fluid to the fluid jack;
- a plurality of devices for removably coupling the first supply lines to each of the plurality of fluid jacks, each device in the plurality of devices comprising a coupler and a link, the coupler being configured to selectively engage a fitting of the fluid jack to facilitate fluid communication between the first supply line and the fluid jack, the link being movable from a first position toward a second position, the link permitting the coupler to be secured to the fluid jack while the link is in the first position, the link permitting disconnection of the coupler from the fluid jack while the link is in the second position; and
- a second supply line for providing the pressurized fluid from a remote source to the device to actuate the link toward the second position,
- wherein the plurality of fluid jacks comprises a group of fixation devices which are actuatable independently or synchronously to secure the transition structure in a desired position relative to the monopile and a group of leveling devices which are actuatable independently or synchronously to level the transition structure.

8. The system of claim 7, wherein each device further comprises a first port engaging the first supply line and a second port engaging the second supply line, the first port having a first fitting that does not mate with the second supply line, the second port having a second fitting which does not mate with the first supply line, thereby preventing the first supply line and the second supply line from being improperly connected to the device.

9. The system of claim 8, wherein each device further comprises a decoupling device having the first port and the second port.

10. The system of claim 8, wherein each device further comprises a check valve, the check valve being movable to an open position to permit fluid flow when a pressure of the pressurized fluid passing through the first port exceeds a threshold pressure.

11. The system of claim 7, wherein each device further comprises a feedback valve, the feedback valve diverting a portion of the pressurized fluid when a pressure of the pressurized fluid exceeds a predetermined pressure.

12. The system of claim 7, wherein each device further comprises a spring biasing the link toward the first position, wherein supplying the pressurized fluid through the second supply line moves the link toward the second position against the bias of the spring.

13. The system of claim 7, wherein each device further comprises a decoupling device supporting the coupler and the link.

14. The system of claim 7, further comprising a conduit which is configured to deliver a securing medium to an opening or passage between the monopile and the transition structure, wherein the plurality of fluid jacks support the transition structure in a desired position while the securing medium is delivered to the opening or passage and cured.

\* \* \* \* \*